United States Patent

Toriyama et al.

[11] 3,888,566
[45] June 10, 1975

[54] ELECTRO-OPTICAL DEVICE INCLUDING AN IMPROVED LIQUID CRYSTAL COMPOSITION

[75] Inventors: Kazuhisa Toriyama; Fumio Nakano; Mikio Sato, all of Hitachi; Hidetoshi Abe, Katsuta; Mikio Kanazaki, Mobara, all of Japan

[73] Assignee: Hitachi, Ltd., Japan

[22] Filed: Aug. 10, 1973

[21] Appl. No.: 387,272

[30] Foreign Application Priority Data
Aug. 11, 1972 Japan............................ 47-79941

[52] U.S. Cl............................ 350/160 LC; 252/299
[51] Int. Cl.............................................. G02f 1/16
[58] Field of Search ....... 350/160 LC; 252/299, 408

[56] References Cited
UNITED STATES PATENTS
3,499,112  3/1970  Heilmeier et al.............. 350/160 LC Primary Examiner—Edward S. Bauer
Attorney, Agent, or Firm—Craig & Antonelli

[57] ABSTRACT

An electro-optical device comprises a nematic liquid crystal layer, means for supporting the liquid crystal layer, and means for applying an electric field in the manner of a time sharing application, to said liquid crystal layer, where the liquid crystal layer contains an effective amount of at least one of halides of organic quaternary nitrogen compounds to enhance dynamic scattering motion of said liquid crystal. The device has improved characteristics of time sharing drive.

28 Claims, 6 Drawing Figures

ELECTRO-OPTICAL DEVICE INCLUDING AN IMPROVED LIQUID CRYSTAL COMPOSITION

This invention relates to a nematic liquid crystal device for displaying numerical figures, letters, graphs, images, etc., and more particularly to a liquid crystal display device capable of being driven by means of pulses with a short pulse width and effecting a good display in the manner of a time sharing without any flickering.

Several display devices based on the use of nematic liquid crystals have been already proposed. One of the devices utilizes a dynamic scattering mode of the nematic liquid crystal. When an electric field is applied to a film of nematic liquid crystals, the orientation of the liquid crystals is disturbed, and light beams incident onto the film layer are scattered and show a white turbidity. The intensity of transmission or reflection of the incident light beams depends upon the applied electric field, and thus a kind of an electro-optical effect is recognized in this system. That is, the display device utilizes this electro-optical effect, so that a desired pattern can be displayed by changeover of voltage or frequency which is applied to the liquid crystal according to input signals. The display device of such kind has a very small power consumption and can be actuated under a relatively low voltage. Therefore, such display device is useful for digital clocks, small table-type electronic computers, electrical measuring instruments, etc. Further, it is also adapted for a large scale display device, because the display panel can be made into a plane. However, a response to a single input signal, that is, a rise time (a time from the application of the voltage until the contrast reaches 90 % of saturation value) is as slow or long as 10 ms (milliseconds), and the threshold voltage is also indefinite.

The simplest method for displaying a large number of segments on the same display surface is the one based on time sharing. That is, it is a display method for successively exciting display points at definite time intervals, as in a Braun tube of the television as if human eyes could see all the display points as excited.

However, when the liquid crystals, whose necessary time for excitation is 10 ms, are used to drive a display device having 8 display points according to the time sharing, a voltage must be applied to each display point for 10 ms, respectively, and thus one run of the application of the voltage to the 8 display points will require 80 ms. As regards one display point, one flashing appears at every 80 ms. Since the human eyes perceive flickering if the flashing having a decay time less than 40 ms appears at more than every 40 ms, simultaneous display of 8 display points having no flickering is impossible in the time sharing display.

To avoid the flickering of said device, nematic liquid crystals mixed with a small amount of cholesteric liquid crystals are used. The nematic liquid crystals containing the cholesteric liquid crystals have the so-called memory effect of retaining the white turbidity for a considerably long period of time, even after the applied voltage has been removed from the liquid crystal mixture. However, the liquid crystal mixture has a long rise time, and therefore the time required for the display is prolonged correspondingly. That is, there is such a disadvantage that an alternating current electric field of several kHz must be applied to the liquid crystal mixture in order to erase the turbidity on the contrary.

In the liquid crystal display, it is an essential condition for matrix display that the threshold voltage is definite and the contrast ratio (a ratio of the intensity of light at scattering due to the application of voltage to the intensity of light at non-scattering) changes drastically with an increase in the applied voltage.

An object of the present invention is to provide an electro-optical display device using a liquid crystal composition capable of readily attaining a dynamic scattering effect with the applied voltage of short impulse width.

Another object of the present invention is to provide an electro-optical display device capable of actuating a large number of optical segments with an application of voltage in the manner of a time sharing.

According to the present invention, a nematic liquid crystal composition containing an effective amount of halides of specific quaternary nitrogen compounds to enhance dynamic scattering of liquid crystals is applied to a liquid crystal electro-optical display device utilizing a time sharing driving system.

The above objects and other objects as well as the features of the present invention will be apparent from the following detailed description by way of drawings.

Figure 1:
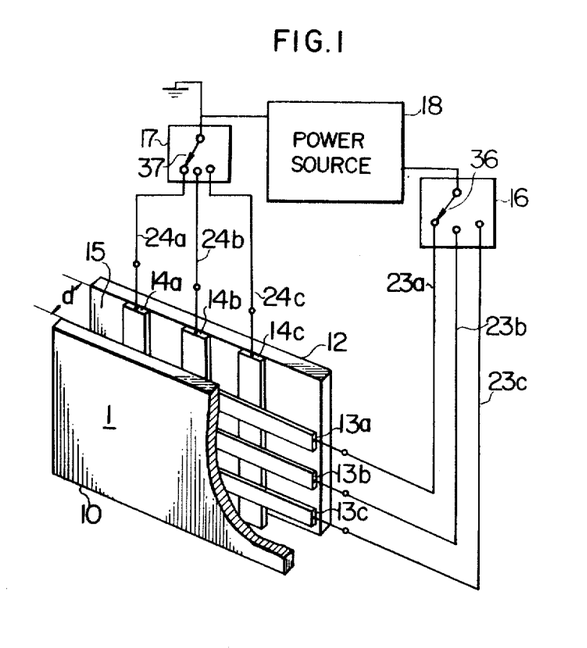
FIG. 1 is a partially cross-sectional perspective view of an electro-optical display device to which the present invention is applied.

The well known, crossed lattice optical display device is shown in FIG. 1 as one example of the electro-optical device, to which the present invention will be applied. However, the scope of the present invention is never restricted to such a device as illustrated in FIG. 1, but it should be understood that one embodiment is shown in FIG. 1 to facilitate the understanding of the present invention. Particularly since the present invention is applicable to a display device made up with a combination of a large number of segments, as will be described later, it should be understood that the following description will not limit the scope of the present invention.

In FIG. 1, a crossed lattice optical display device 1 has a transparent glass back support plate 12 and a transparent glass front support plate 10. These two support plates are placed at a distance $d$ of usually about 5 to 30 microns from each other, and appropriate liquid crystals (not shown in the drawing) are inserted into a phace 15 between these support plates. A plurality of transparent electrodes 13a, 13b and 13c are arranged in parallel on the front support plate 10, and a plurality of transparent electrodes 14a, 14b and 14c are arranged in parallel on the back support plate 12. The electrodes 13a, 13b and 13c of the device 10 are connected to a switch 16 through connecting means 23a, 23b and 23c, respectively, and the electrodes 14a, 14b and 14c to the switch 17 through connecting means 24a, 24b and 24c, respectively. The switches 16 and 17 are connected to an earthed power source 18 through contact means 36 and 37, respectively. In the power source a pulse generator and control means are included.

In the transmission-type display device an observer is positioned at a side opposite to the light incident side. The liquid crystals at intersections of the electrodes are disturbed when a sufficiently high voltage is applied between the electrodes, and scatter the incident light. As a result, the observer can perceive that the disturbed parts are darker than other non-disturbed parts.

In the reflection-type display device, the observer is positioned at the same side as the light incident side, and observes the reflected light which is scattered by the disturbance of the liquid crystals and reflected on a reflective film formed on the inside surface (the side in contact with the liquid crystals) of the back support plate of the display device.

As the transparent support plates, various kinds of transparent solid, such as various kinds of glass, molten quartz, transparent corundum, transparent synthetic and natural resins, etc. can be used. The transparent electrodes can be prepared by vapor-depositing, for example, indium oxide or tin oxide onto the support plates. The electrode to be formed on the reflective film may be, for example, a film of copper, aluminum, chromium or nickel.

Now, explanation will be made of characteristics of the liquid crystal composition according to the present invention.

Figure 2:
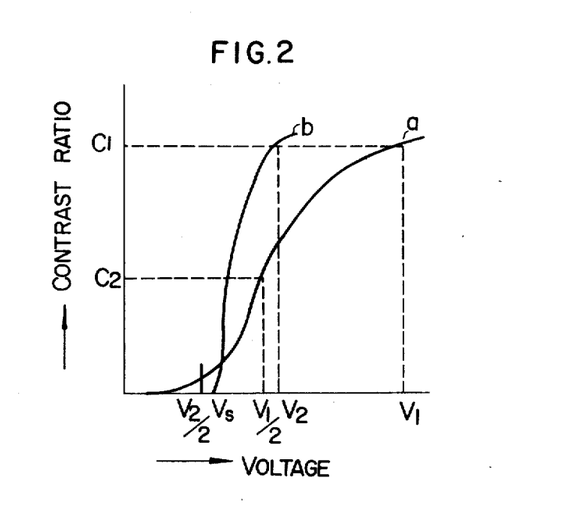
FIG. 2 is a graph showing relations between the applied voltage and contrast ratio of the nematic liquid crystals.
Figure 3:
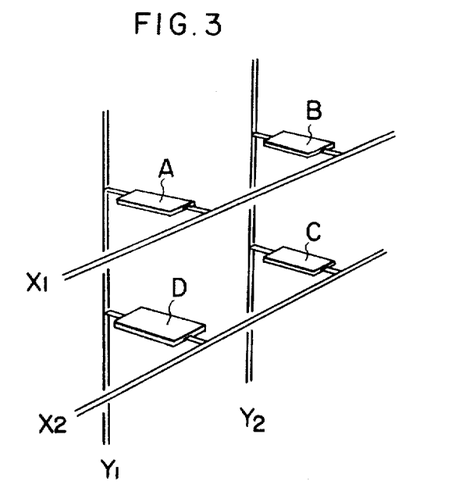
FIG. 3 is a view showing a model of X—Y matrix-type display elements.

Let us consider such a case that a matrix liquid crystal display device shown in FIG. 3 is actuated, where the liquid crystals having a voltage-contrast ratio characteristic shown in FIG. 2 are used. To display a segment A, a voltage is applied between the electrodes $X_1$ and $Y_1$. To obtain a contrast ratio $C_1$ when the liquid crystals having the characteristic shown by a in FIG. 2, a voltage $V_1$ is necessary. By applying a voltage $+V_1/2$ to the electrode $X_1$ and voltage $-V_1/2$ to the electrode $Y_1$, a potential $V_1$ is obtained, and the segment A can be displayed with the contrast ratio $C_1$. Since a voltage $+V_1/2$ is applied to a segment B and a voltage $-V_1/2$ to a segment D at the same time, the segments B and D are also displayed with contrast ratio $C_2$ corresponding to the potential $V_1/2$. That is, a cross talk results in the display device.

A system based on frequency conversion has been proposed to solve this problem. That is, when an alternating current electric field with sufficiently high frequency is applied to liquid crystals, the dynamic scattering mode of the liquid crystals is quenched. In other words, an alternating current voltage with a low frequency capable of effecting the scattering is selectively applied to the parts to be displayed, whereas an alternating current voltage with a sufficiently high frequency capable of quenching the scattering is selectively applied to the parts not to be displayed. However, a circuit for the selective application of two kinds of voltages with different frequencies becomes a complicated one, and thus is not always deemed as an economical circuit.

In the case of liquid crystals having the characteristic as shown by b in FIG. 2, a voltage $V_2$ must be applied to obtain a contrast ratio $C_1$. By applying a voltage $+V_2/2$ to the electrode $X_1$ and a voltage $-V_2/2$ to the electrode $Y_1$, the segment A can be displayed with the contrast ratio $C_1$. At that time, voltages $V_2/2$ are applied to the segments B and D, respectively, but since such voltages are less than the threshold voltage $V_x$, the segments B and D undergo no scattering, that is, these segments are not displayed.

Therefore, if a liquid composition having a definite threshold voltage and a good contrast ratio-voltage characteristic as shown by b in FIG. 2 and quick response is used, a liquid crystal display devive with a clear display having no flickering, based on the time sharing, can be obtained.

Figure 4:
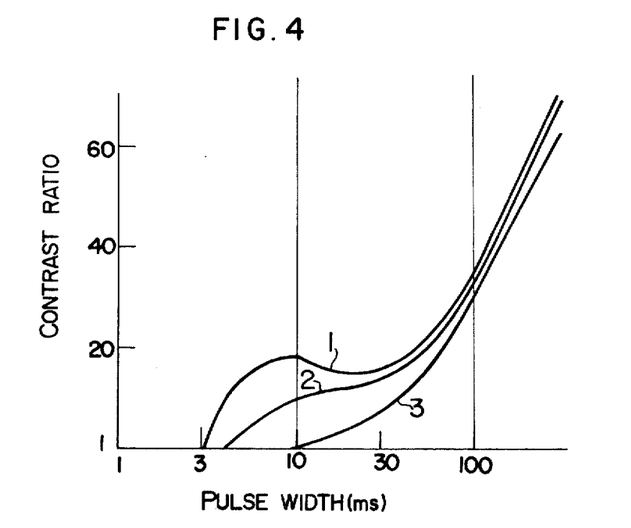
FIG. 4 is a graph showing relations between the applied voltage-pulse width and contrast ratio of the conventional liquid crystals.

The present inventors took notice of the fact that nematic liquid crystals have a characteristic behavior in the contrast ratio characteristic against the pulse width of the applied voltage. In FIG. 4, a contrast ratio characteristic of a liquid crystal comprising methoxybenzilidene parabutylaniline (80 % by weight) and ethoxybenzilidene parabutylaniline (20 % by weight) is shown when the applied voltage and the pulse width are changed (duty ratio 1/8). As is apparent from FIG. 4 wherein curve 1 shows the result of 35 volts of applied voltage, curve 2 the result of 30 volts and curve 3 the result of 25 volts, the contrast ratio is decreased with shorter pulse width, and finally no scattering takes place at all. The similar tendencies are observed in other applied voltages. To carry out a time shearing display without flickering to human eyes, a high contrast ratio is necessary in a shorter pulse width driving. It is seen that the contrast ratio with respect to the applied voltage of 35 V (curve 1) is decreased with the reduction in the pulse width, but a maximum appears in the contrast ratio at a pulse width of about 8 to 15 ms. That is, the contrast ratio is not always reduced directly or linearly with the reduction in the pulse width. Thus, the present inventors perceived that a time sharing display would be possible without any flickering by reference to the foregoing facts, if such liquid crystals as having a high maximum of the contrast ratio under the driving condition of low applied voltage and short pulse width is used.

As a result of studies on various additives on the basis of the perception, the present inventors have found that a liquid crystal composition responsive to pulse driving can be obtained by adding a halide of organic quaternary nitrogen compounds, such as ammonium halides, pyridinium halides and acridinium halides to a nematic liquid crystal composition.

The ammonium halides used in the present invention are compounds represented by the general formula:

wherein $R_1$, $R_2$, $R_3$ and $R_4$ represent alkyl or aralkyl groups having not more than 20 carbon atoms and phenyl group, and X represents a halogen atom selected from chlorine, bromine and iodine, and include, for example, hexadecyltrimethylammonium bromide, ethylhexadecyldimethylammonium bromide, phenylbenzyldimethylammonium chloride, phenyltrimethylammonium bromide, etc.

The pyridinium halides used in the present invention are pyridinium halides represented by the general formula:

(II)

wherein R represents an alkyl group having not more than 20 carbon atoms and phenyl group and X represents a halogen atom selected from chlorine, bromine and iodine, and include, for example, 1-hexadecylpyridinium chloride, 1-hexadecylpyridinium bromide, 1,1'-ethylenebispyridinium bromide, etc.

The acridinium halides used in the present invention are acridinium halides represented by the general formula:

(III)

wherein R represents an alkyl group having not more than 20 carbon atoms and phenyl group and X represents a halogen atom selected from chlorine, bromine, and iodine, and include, for example, 10-methylacridinium chloride, 10-methylacridinium bromide, etc. These halides are used alone or in a mixture of two or more thereof.

Any nematic liquid crystal compound can be used, so long as they are the compounds capable of effecting dynamic scattering as the liquid crystals, for example, the nematic liquid crystals, in which the direction of dipole moment of the molecule is not identical with the direction of longitudinal axis of the molecule. It is also necessary that these liquid crystals have a range of liquid crystal temperature (mesomorphic temperature) at about temperature as the liquid crystals for the display device.

The liquid crystal compounds used in the present invention include such ordinary liquid crystal compounds as p-methoxybenzylidene-p-butylaniline, p-ethoxybenzylidene-p-butylaniline, p-butoxybenzylidene-p-butylaniline, p-butoxybenzylidene-p-n-propylaniline, p-hexyloxybenzylidene-p-toluidine, p-pentyloxybenzylidene-p-toluidine, p-heptyloxybenzylidene-p-acetoxyaniline, etc. These liquid crystal compounds are used alone or in a mixture of two or more thereof.

A liquid crystal composition having a good responsibility to pulse driving can be obtained by adding at least 0.05 % by weight of the halide of the quaternary nitrogen compound to said liquid crystal compound, based on the weight of the liquid crystal compound. However, the addition of a larger amount of the halide does not always bring about a better result, and in view of Example 12, which follows, up to about 1 % by weight of the halide is preferable range. When an amount of the halide added exceeds 1 %, an impedance of the liquid crystal composition considerably decreases whereby consumption of power increases.

Now, the present invention will be described in detail by way of examples.

Examples 1 – 6

0.2 % by weight of the halides of quaternary nitrogen compounds listed in Table 1 was added to memthoxy-benzylidene-p-butylaniline, and mixed therewith until it was completely dissolved therein. Each of the resulting liquid crystal compositions was placed on a glass plate (40 mm × 5 mm × 3 mm thick) vapor-deposited with an aluminum film, and a glass plate (the same sizes as above) deposited with a tin oxide transparent electroconductive film by spraying was placed thereon to sandwich the liquid crystal composition between these two plates, using a 9 μ-thick polyester film as a spacer, whereby a kind of reflection-type display elements was prepared. A pulse voltage was applied to the element, using a pulse widthvariable voltage generator, where the transparent electroconductive film was used as an anode.

Contrast ratio was measured by applying a direct current pulse voltage of pulse width of 0.5 ms to 300 ms and voltage of 1 to 40 V, while fixing the duty ratio to 1/8. Better responsibility to short pulse width drive was obtained than the conventional one. Contrast ratio at pulse width of 2 ms, duty ratio of 1/8 and applied voltage of 30 V are shown in Table 1.

Figure 5:
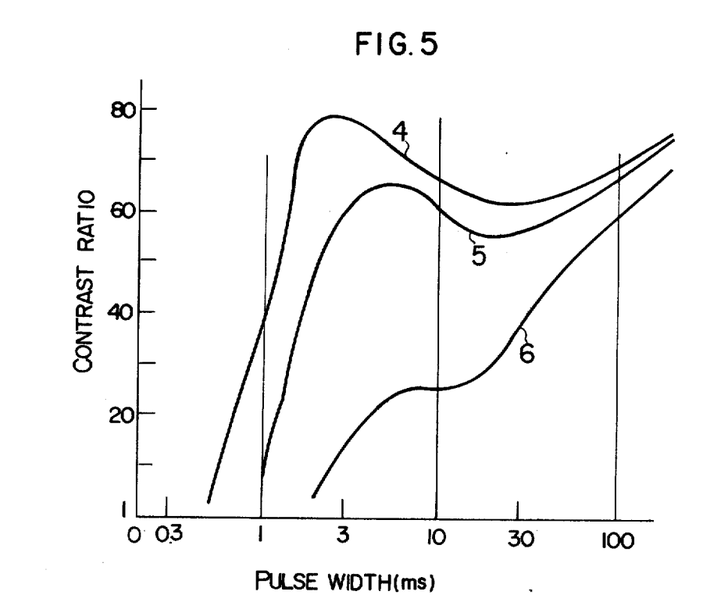
FIG. 5 is a graph showing relations between the applied voltage-pulse width and contrast ratio of the liquid crystals according to the present invention.

As is apparent from Table 1, excellent contrast ratios were obtained at such a short pulse width as 2 ms in all of these Examples in the present invention. The changes in responsibility to short pulse width of the crystal liquid composition of Example 4 at the applied voltages 25, 30 and 35 V are shown by curves 4, 5 and 6, respectively in FIG. 5. The contrast ratio is considerably high, and the responsibility to short width of 1 to 10 ms pulse is excellent, as compared with the conventional ones shown in FIG. 4.

That is, the liquid crystal compositions exhibit the maximum of contrast ratio at a pulse width smaller than 10 ms, which is suitable for display to time sharing. Further, the state of display according to the time sharing was observed, and a clear display was obtained without any flickering.

Table 1

| Ex. No. | Additive | Chemical structure | Contrast |
|---|---|---|---|
| 1 | Hexadecyltrimethyl-ammonium bromide | $\left[ C_{16}H_{33} - N \begin{smallmatrix} CH_3 \\ -CH_3 \\ CH_3 \end{smallmatrix} \right]^+ \cdot Br^-$ | 14 |

(cont'd)

Table 1 (cont'd)

| | | | |
|---|---|---|---|
| 2 | Ethylhexadecyl dimethyl-ammonium bromide | $[C_{16}H_{33}-N{<}^{CH_3}_{CH_3}_{C_2H_5}]^+ \cdot Br^-$ | 49 |
| 3 | Phenylbenzyldimethyl-ammonium chloride | $[C_6H_5-CH_2-N(CH_3)_2-CH_2-C_6H_5]^+ \cdot Cl^-$ | 42 |
| 4 | 1-Hexadecylpyridinium bromide | $[C_5H_5N-C_{16}H_{33}]^+ \cdot Br^-$ | 48 |
| 5 | 1-Hexadecylpyridinium chloride | $[C_5H_5N-C_{16}H_{33}]^+ \cdot Cl^-$ | 25 |
| 6 | 10-Methylacridinium chloride | $[\text{acridinium-}N-CH_3]^+ \cdot Cl^-$ | 27 |
| Conventional Example | None | — | 1 |

Examples 7 – 11

0.2 % by weight of 1-hexadecylpyridinium chloride was added to each of liquid crystal compositions listed in Table 2 and completely dissolved therein. Reflection-type display elements were prepared, using the resulting mixtures, in the same manner as in Examples 1 – 6, and responsibility to short width pulse was measured.

Contrast ratio at pulse width of 2 ms., duty ratio of 1/8, and voltage of 30 V are shown in Table 2, and excellent contrast ratios were obtained in all of Examples 7 – 11, as compared with the conventional Example.

A matrix display device of 5 × 7 elements comprised with strip electrodes was prepared, using the liquid crystal composition of Example 9, and was driven by the time shearing. A good display was obtained without any flickering.

Table 2

| Example No. | Liquid crystal composition | Liquid crystal temperature range | Contrast |
|---|---|---|---|
| 7 | Methoxybenzylidene-p-butylaniline (50 parts) + 1-hydroxymethoxybenzylidene-p-butoxyaniline (50 parts) | 20 – 48°C | 40 |
| 8 | Methoxybenzylidene-p-butylaniline (80 parts) + ethoxybenzylidene-p-butylaniline (20 parts) | 10 – 47°C | 35 |
| 9 | Methoxybenzylidene-p-butylaniline (60 parts) + ethoxybenzylidene-p-butylaniline (40 parts) | 10 – 48°C | 14 |
| 10 | Methoxybenzylidene-p-butylaniline (50 parts) + ethoxybenzylidene-p-butylaniline (45 parts) + methylbenzylidenebutylaniline (5 parts) | –10 – 56°C | 22 |
| 11 | Eutectic mixture of 4-methoxy-4'-butylazoxybenzene and 4-butyl-4-methoxybenzene | 16 – 76°C | 12 |
| Conventional Example | The same liquid crystal as in Example 8. No halide added. | 10 – 47°C | 1 |

Remark: Parts in Table 2 are by weight

Example 12

Figure 6:
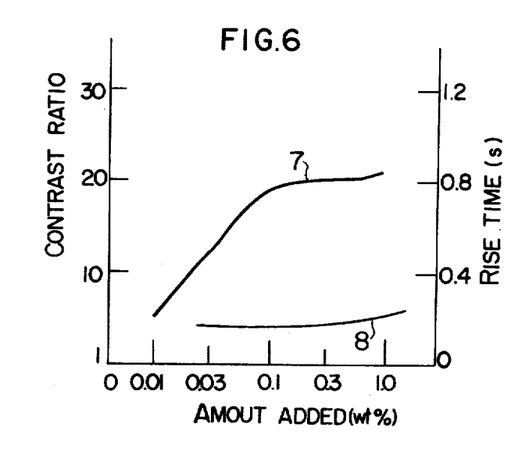
FIG. 6 is a graph showing relations between the amount of hexadecyltrimethylammonium bromide added, and contrast ratio and rise time.

Liquid crystal composition were prepared by adding various amounts of hexadecyltrimethylammonium bromide to a 50 : 50 (by weight) mixture of p-methoxybenzylidene-p-butylaniline and p-ethoxybenzylidene-p-butylaniline, and relations between the contrast ratio and rise time were investigated at applied voltage of 30 V, pulse width of 2 ms, and duty ratio of 1/8. The results are shown in FIG. 6. It is apparent from the contrast ratio curves 7 and the rise time curve 8 that the desirable range of hexadecyltrimethylammonium bromide to be added is 0.05 to 1.0 % by weight.

As described above, the electro-optical device obtained according to the present invention can be utilized not only as the conventional elements such as light switch element and optical modulation element, but also as a cheap display device according to the time sharing, because an electric circuit is simple. Especially, the present electro-optical element is effectively utilized in an X—Y matrix type display device, where electrodes are arranged in stripes, and a set of the electrodes are crossed with another to utilize the crossed points as display points. The present electro-optical device is suitable for large scale display devices because the circuit can be simplified.

In the foregoing Examples, only reflection-type elements have been illustrated, but the present electro-optical element can be also applied to the display devices of transmission type, projection type, etc.

In the present electro-optical display device, a pulse generator is used for producing a pulse having an amplitude larger than a dynamic scattering motion limit but smaller than a discharge voltage of said liquid crystal and a pulse width smaller than 10 ms, preferably 0.5 - 10 ms.

In the present electro-optical display device, a means is operatively connected to said pulse generator for selectively supplying said pulse to the selected electrodes of first electrode means and second electrode means at a predetermined order for said selected electrode with a predetermined time interval in order to apply the pulsating electric field to the selected segments corresponding to said selected electrodes thereby to generate said dynamic scattering motion in the liquid crystal of the selected segments. The time interval is smaller than a period in which an intensity of light scattering to be observed decays to a predetermined value.

What is claimed is:

1. In an electro-optical device comprising a nematic liquid crystal layer capable of effecting dynamic scattering; means for supporting said liquid crystal layer; a plurality of first electrode means for applying a pulse electric field to said liquid crystal layer, said liquid crystal layer being divided thereby into a plurality of segments; second electrode means for applying a pulse electric field to said liquid crystal layer, the second electrode means being positioned opposite to the first electrode means, the liquid crystal layer being sandwiched between the first electrode means and the second electrode means; means for applying a pulse electric field through the first and second electrode means to the segments of the liquid layer by time sharing, the improvement wherein said liquid crystal layer contains a sufficient amount of at least one of halide of organic quaternary nitrogen compounds selected from the group consisting of pyridinium halides and acridinium halides to enhance the dynamic scattering motion of said liquid crystal.

2. An electro-optical device according to claim 1, wherein said halide is a pyridinium halide represented by the following general formula:

wherein R is a member selected from the group consisting of alkyl group having not more than 20 carbon atoms and phenyl groups and X is a halogen atom selected from chlorine, bromine and iodine.

3. An electro-optical device according to claim 1, wherein said halide is an acridinium halide represented by the following general formula:

wherein R is a member selected from the group consisting of alkyl groups having not more than 20 carbon atoms and phenyl groups, and X is a halogen atom selected from chlorine, bromine and iodine.

4. An electro-optical device according to claim 1, wherein the liquid crystal layer contains 0.05 to 1 % by weight of said halide, based on the weight of the liquid crystal.

5. An electro-optical display device comprising:
   1. a pair of supporting members at least one of them being transparent, whereby a dynamic scattering motion of a liquid crystal is observed through said supporting members;
   2. a layer of a nematic liquid crystal containing a halide salt of an organic quaternary nitrogen compound selected from the group consisting of pyridinium halides and acridinium halides, said halide salt being dissolved in said layer in an amount effective to enhance said dynamic scattering motion of said liquid crystal, said layer being interposed between said supporting member;
   3. first electrode means for applying a pulsating electric field for generating said dynamic scattering motion to said layer, wherein a plurality of displaying segments are formed by said first electrode means in said layer;
   4. second electrode means for applying said pulsating electric field in cooperation with said first electrode means, said first and second electrode means being formed on the inner surfaces of said respective supporting members;
   5. a pulse generator for producing a pulse having an amplitude larger than a dynamic scattering motion limit but smaller than a discharge voltage of said liquid crystal and a pulse width smaller than 10 ms;
   6. means operatively connected to said pulse generator for selectively supplying said pulse to the selected electrodes of said first electrode means and said second electrode means at a predetermined order for the said selected electrodes with a predetermined time interval in order to apply said pulsating electric field to the selected segments corresponding to said selected electrodes thereby to generate said dynamic scattering motion in said liq- uid crystal of said selected segments, said time interval being smaller than a period in which an intensity of light scattering to be observed decays to a predetermined value.

6. An electro-optical device according to claim 5, wherein said halide salt is a pyridinium halide represented by the following general formula:

wherein R is a member selected from the group consisting of alkyl groups having not more than 20 carbon atoms and a phenyl groups and X is a halogen atom selected from chlorine, bromine and iodine.

7. An electro-optical device according to claim 5, wherein said halide salt is an acridinium halide represented by the following general formula:

wherein R is a member selected from the group consisting of alkyl groups having not more than 20 carbon atoms and phenyl groups and X is a halogen atom selected from chlorine, bromine and iodine.

8. An electro-optical device according to claim 5, wherein the liquid crystal layer contains 0.05 to 1 % by weight of the halides of the organic quaternary nitrogen compounds, based on the weight of the liquid crystal.

9. An electro-optical device comprising a layer of nematic liquid crystals capable of effecting dynamic scattering, and means for applying an electric field to said film to effect said dynamic scattering, the improvement wherein said film contains a halide salt of an organic quaternary nitrogen compound selected from the group consisting of pyridinium halides and acridinium halides in an amount sufficient to enhance the dynamic scattering motion of the liquid crystals in said layer when an electric field is applied thereto.

10. The device of claim 9, wherein said halide salt is a pyridinium halide represented by the following general formula:

wherein R is alkyl having not more than 20 carbon atoms or phenyl and X is chlorine, bromine or iodine.

11. The device of claim 10, wherein about 0.05 to 1 % by weight of said halide salt is dissolved in said layer based on the weight of said nematic liquid crystal.

12. The device of claim 9, wherein said halide salt is an acridinium halide represented by the following general formula:

wherein R is alkyl having not more than 20 carbon atoms or phenyl and X is chlorine, bromine or iodine.

13. The device of claim 12, wherein about 0.05 to 1 % by weight of said halide salt is dissolved in said layer based on the weight of said nematic liquid crystal.

14. The device of claim 9, wherein said halide salt is selected from the group consisting of 1-hexadecylpyridinium chloride, 1-hexadecylpyridinium bromide and 1,1'-ethylenebispyridinium bromide.

15. The device of claim 9, wherein said halide salt is selected from the group consisting of 10-methylacridinium chloride and 10-methylacridinium bromide.

16. The device of claim 9, wherein said nematic liquid crystal is selected from the group consisting of p-methoxybenzylidene-p-butylaniline, p-ethoxybenzylidene-p-butylaniline, p-butoxybenzylidene-p-butylaniline, p-butoxybenzylidene-p-n-propylaniline, p-hexyloxy-benzylidene-p-toluidine, p-pentyloxybenzylidene-p-toluidine and p-heptyloxybenzylidene-p-acetoxyaniline.

17. The device of claim 9, wherein said nematic liquid crystal is selected from the group consisting of 4-methoxy-4'-butylazoxybenzene and 4-butyl-4'-methoxybenzene.

18. The device of claim 17, wherein said nematic liquid crystal is a eutectic mixture of 4-methoxy-4'-butylazoxybenzene and 4-butyl-4'-methoxybenzene.

19. A composition comprising nematic liquid crystals and a sufficient amount of a halide salt of an organic quaternary nitrogen compound selected from the group consisting of pyridinium halide and acridinium halide to enhance the dynamic scattering motion of said nematic liquid crystals.

20. The composition of claim 19, wherein said halide salt is a pyridinium halide represented by the following general formula:

wherein R is alkyl having not more than 20 carbon atoms or phenyl and X is chlorine, bromine or iodine.

21. The composition of claim 20, wherein about 0.05 to 1 % by weight of said halide salt is dissolved in said composition based on the weight of said nematic liquid crystal.

22. The composition of claim 19, wherein said halide salt is an acridinium halide represented by the following general formula:

wherein R is alkyl having not more than 20 carbon atoms or phenyl and X is chlorine, bromine or iodine.

23. The composition of claim 22, wherein about 0.05 to 1 % by weight of said halide salt is dissolved in said composition based on the weight of said nematic liquid crystal.

24. The composition of claim 19, wherein said halide salt is selected from the group consisting of 1-hexadecylpyridinium chloride, 1-hexadecylpyridinium bromide and 1,1'-ethylenebispyridinium bromide.

25. The composition of claim 19, wherein said halide salt is selected from the group consisting of 10-methylacridinium chloride and 10-methylacridinium bromide.

26. The composition of claim 19, wherein said nematic liquid crystal is selected from the group consisting of 1-methoxybenzylidene-p-butylaniline, p-ethoxybenzylidene-p-butylaniline, p-butoxybenzylidene-p-butylaniline, p-butoxybenzylidene-p-n-propylaniline, p-hexyloxy-benzylidene-p-toluidine, p-pentyloxybenzylidene-p-toluidine and p-heptyloxybenzylidene-p-acetoxyaniline.

27. The composition of claim 19, wherein said nematic liquid crystal is selected from the group consisting of 4-methoxy-4'-butylazoxybenzene and 4-butyl-4'-methoxybenzene.

28. The composition of claim 27, wherein said nematic liquid crystal is an eutectic mixture of 4-methoxy-4'-butylazoxybenzene and 4-butyl-4'-methoxybenzene.

* * * * *